(12) United States Patent
Crossland et al.

(10) Patent No.: US 6,474,106 B1
(45) Date of Patent: Nov. 5, 2002

(54) RARE EARTH AND ALUMINA-DOPED OPTICAL FIBER PREFORM PROCESS

(75) Inventors: Carl E. Crossland, Campbell, NY (US); Gang Qi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/451,175

(22) Filed: Nov. 30, 1999

(51) Int. Cl.$^7$ ............................................ C03B 37/027
(52) U.S. Cl. ............................. 65/377; 65/390; 65/421; 65/404
(58) Field of Search ..................... 65/390, 421, 404, 65/382, 381, 399, 377

(56) References Cited

U.S. PATENT DOCUMENTS

| | | | |
|---|---|---|---|
| 4,486,212 A | | 12/1984 | Berkey |
| 4,579,571 A | * | 4/1986 | Hicks |
| 4,616,901 A | * | 10/1986 | MacChesney |
| 4,738,873 A | * | 4/1988 | Roba |
| 4,787,927 A | * | 11/1988 | Mears |
| 4,799,946 A | * | 1/1989 | Ainslie .......................... 65/390 |
| 5,058,976 A | | 10/1991 | DiGiovanni et al. |
| 5,131,936 A | * | 7/1992 | Cognolato |
| 5,151,117 A | * | 9/1992 | Bartholomew ............... 65/399 |
| 5,236,481 A | | 8/1993 | Berkey |
| 5,491,581 A | | 2/1996 | Roba |
| 5,526,459 A | | 6/1996 | Tanaka et al. |
| 5,638,204 A | | 6/1997 | Grasso et al. |
| 5,961,682 A | * | 10/1999 | Lee .............................. 65/390 |

FOREIGN PATENT DOCUMENTS

JP  10-167746  *  6/1998

OTHER PUBLICATIONS

English Abstract of JP 4–231336, 1992.*
Optical Fibres With An An $Al_2O_3$—Doped Silicate Core Composition (Simpson et al) Electronics Letters v 19, 7 p 261–262, Mar. 31. 1983.*
VAN No Strands Scientific Encyclopedia (6th ed) p. 2903, 1983.*
Optical Fiber Communications Principle and Practice, John M. Senior, 1985, pp. 118–127.

* cited by examiner

Primary Examiner—John Hoffmann
(74) Attorney, Agent, or Firm—Woodcock Washburn LLP (57) ABSTRACT

The present invention discloses novel methods for fabricating optical fiber glass preforms which may contain alumina, germania, erbium, or other rare earth metals as dopants. Doping with a higher concentration of alumina enhances the solubility of the erbium, or other rare earth, dopant within the glass and the resultant optical properties of the fiber. However, the addition of an alumina dopant can cause processing difficulties due to the formation of inclusions, such as gas bubble, seeds or crystallite formation, within the glass preform or glass cane. The present invention overcomes these processing difficulties and produces glass preforms or canes that are inclusion-free.

10 Claims, 3 Drawing Sheets

RARE EARTH AND ALUMINA-DOPED OPTICAL FIBER PREFORM PROCESS

FIELD OF THE INVENTION

The present invention relates to improved methods for forming rare earth and alumina ($Al_2O_3$) doped glass preforms from which optical fibers can be made. More particularly, this invention discloses methods for producing high alumina-doped, yet inclusion-free, optical waveguide preforms which can be drawn into optical waveguide components, such as couplers and amplifiers.

BACKGROUND OF THE INVENTION

Rare earth-doped optical fibers, such as erbium-doped glass, are suitable for many uses, particularly as optical amplifiers. These amplifiers make it possible to amplify an optical signal without first converting it into an electronic signal.

Erbium-doped fibers ("EDF") are typically used in wavelength division multiplexing ("WDM") systems. WDM are high data rate systems that allow simultaneous transmission of several signals in an optical waveguide at differing wavelengths. These systems usually include a source that can send signals at multiple wavelengths or input channels, a multiplexer, an optical fiber cable, a demultiplexer, and multiple output sources or output channels.

An EDF allows the amplification of an optical signal having a wavelength range of about 1530 to about 1610 nanometers ("nm"). The erbium-doped fiber acts as an amplifier when a continuous source of pump light, at a wavelength of either 980 or 1480 nm, is propagated through its length. When the optical signal is also sent through the erbium-doped fiber, the erbium ions, excited by the pump light, amplify the signal through the stimulated emission of photons from the excited state. Other rare earth dopants, such as praseodymium and neodymium, are possible candidates to amplify optical signals around the 1300 nm wavelength range.

An important parameter for an EDF is bandwidth. This allows the EDF to handle more channels, or accommodate more data, in a WDM system and similar applications.

An optical fiber preform is generally comprised of a central core and an outer cladding layer. The core has a higher refractive index than the cladding layer. When the preform is drawn into an optical fiber, the difference in refractive indices between the two layers allows the propagation of the optical signal within the core. A typical optical fiber glass core composition is comprised mainly of high purity $SiO_2$ glass with lesser amounts of $GeO_2$ and/or other dopants, depending upon the desired optical properties. Fibers whose cores are doped with $GeO_2$ exhibit low loss characteristics which extend to wavelengths around 1600 nm.

Alumina is well known in the art as a co-dopant in optical fiber preform glass compositions which also contain erbium or other rare earth dopants. Alumina, when used in these compositions, enhances the processing of the fiber preform by increasing the solubility of erbium or other rare earth dopants in the resultant fiber. Optical fibers drawn from alumina-containing preforms exhibit enhanced optical properties, such as a lower ripple value and an expanded bandwidth. Higher concentrations of alumina within an EFA improves its performance by flattening the Er gain spectrum over a given bandwidth.

Figure 1A:
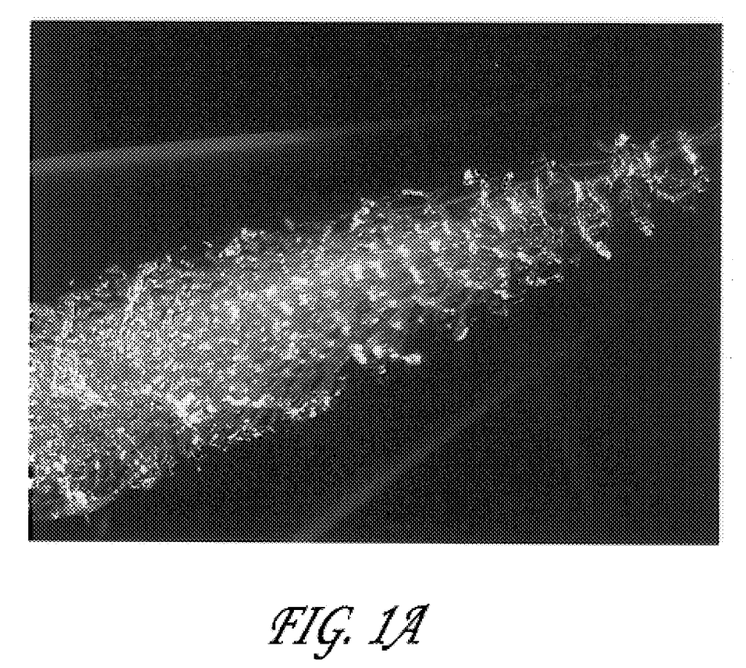
FIG. 1(a) is a photograph, taken at 10× magnification, of a Type III (see Table I) alumina-containing preform fabricated by methods known in the art.

Despite its many advantages, higher concentrations of alumina can present difficulties during the fabrication of the glass preform and optical fiber. One of the main difficulties encountered in fabricating alumina-containing glass preforms is the formation of inclusions, seeds (gas bubbles) or crystals. The presence of inclusions within the preform can render the subsequent fiber drawing process difficult or even impossible. Inclusions can decrease the length of fiber drawn from the preform and, at worst, prohibit fiber drawing entirely. FIG. 1(a) is a photograph taken at a magnification of approximately 10 times actual size that illustrates the seeds present in a Type 3 (see supra Table I in Detailed Description) glass preform made from methods known in the art. Preforms containing many inclusions are usually scrapped, thereby increasing manufacturing costs. If the preform can be drawn into a fiber, inclusions can be a major source of attenuation loss due to scattering and decreased strength in the resulting fiber. For the manufacture of high quality preforms, particularly core preforms known as rods or canes, the reduction, and preferably, the elimination of inclusions is of critical importance.

There are many proposed mechanisms of bubble formation in alumina-containing glass preforms. Glass preforms are usually formed by a chemical vapor deposition process. Oftentimes, when the dopant system includes solids rather than liquids, such as $AlCl_3$, solid dopant particles can be carried to the reaction zone by carrier gases during the soot lay-down step. Since the dwell time of solid particles in the heat source or flame is minimal, the solid particles cannot be completely reacted, or oxidized. These unreacted solid particles may attach to the glass particulate, or soot, and become incorporated into the soot blank. The particles eventually react and decompose in subsequent processing steps involving elevated temperatures. For example, during the consolidation step, solid particles of the aluminum-containing precursor such as $AlCl_3$ can react with oxygen at temperatures which range from about 1400 C to about 1500 C to form alumina $Al_2O_3$. The decomposition of these solid particles causes gas bubbles of $Cl_2$ to form in the resultant preform or preform core.

In preforms that contain both $GeO_2$ and $Al_2O_3$ as dopants, gas bubble formation can result from, or be aggravated by, $GeO_2$ thermal decomposition. During the drawing or re-drawing step, the $GeO_2$ particles within the soot blank are driven to convert into their gaseous phase and form gas bubbles within the body of the preform or preform core. These further contribute to seed formation.

Subsequent anneal processing may be employed to reduce or eliminate the gas bubbles that are formed. For alumina doped preforms, additional heat processing may cause the unwanted formation of $Al_2O_3$ crystals, namely cristobalite or mullite, within the glass. Lower temperatures and $Al_2O_3$ concentrations within the composition tend to form cristobalite, whereas higher temperatures and higher $Al_2O_3$ concentrations tend to form mullite and cristobalite. The likelihood of crystallite formation increases as the concentration of alumina dopant increases. Crystallites within the preform, like gas bubbles or seeds, can inhibit or prevent the preform from being drawn into fiber. Further, crystallites can become a scattering site and degrade the resulting optical properties of the fiber.

SUMMARY OF THE PRESENT INVENTION

The present invention improves the performance of an erbium doped fiber by increasing the concentration of alumina dopant within the optical fiber waveguide preform core. The present invention also provides methods for producing a rare earth and high concentration alumina doped optical fiber preforms which are substantially inclusion free. The methods of the present invention are particularly useful for making optical waveguide fibers drawn from a glass comprising $Al_2O_3$, $GeO_2$, and $SiO_2$, which can be used as host glass containing dopants such as erbium or other rare earths for making optical amplifiers.

The method of the present invention allows for high alumina doping yet substantially eliminates inclusions in the glass preform or cane by modifying certain process parameters during the soot lay-down step. During this step, a glass particulate, or soot blank, is created by reacting glass constituents in vapor form with oxygen via a heat source, such as a flame burner, in the reaction zone. The soot particles are deposited onto the surface of a rotating, removable mandrel. The burner or torch traverses across the length of the rotating mandrel, thus allowing a uniform deposit of soot along its surface. Unlike many other glass precursors or dopants, the aluminum-containing glass precursor, such as $AlCl_3$, is in solid, rather than liquid, form. The present method increases the temperature range at which the aluminum-containing solid is sublimated from about 130 C to about 170 C, or more preferably, from about 150 C to about 170 C. The increased sublimation temperatures result in an increase in the concentration of alumina in the resultant soot blank. The aluminum-containing vapor is transported from the sublimator to the reaction zone via a carrier gas, such as an helium, argon, or other inert gases. In addition, a further embodiment of the present invention reduces the flow rate of the carrier gas by more than half, from its typical value which ranges from about 1.4 to about 1.8 standard liter per minute ("splm") to about 0.5 to about 0.7 splm. In yet another embodiment of the present invention, the traverse speed of the heat source or burner across the soot blank is increased from about 2 cm/sec to a range of about 2.5 cm/sec to about 3.5 cm/sec, more preferably 3.0 cm/sec, to prevent overheating of the soot blank.

The present invention also eliminates inclusions in the preform by modifying the consolidating or sintering step. As mentioned earlier, the presence of alumina and germania as dopants within the preform core can cause competing reactions which foster inclusions in the resultant preform or cane. Aluminum-containing solid particles are transported into the soot blank rather than oxidized in the reaction zone. These particles eventually form $Al_2O_3$ by subsequent heating. However, subsequent heating, at higher temperatures to oxidize the aluminum-containing particles, causes the $GeO_2$ in the soot blank to thermally decompose or convert to its gaseous phase. In order to prevent $GeO_2$ thermal decomposition, the temperature of the consolidating step is reduced to a range from about 1400° C. to 1500° C., more preferably from about 1400° C. to about 1450° C., compared with a typical sintering temperature of about 1495° C. In addition, the centerline of the soot blank is cooled by a high helium or other inert gas flow at about 1 to about 5 slpm, preferably between about 1.5 to about 3.0 slpm. This flow rate is higher than the normal flow rate. The combination of lower consolidation temperatures and a higher helium or inert gas flow prevents $GeO_2$ thermal decomposition from occurring during the consolidating step.

Lastly, the drawing step of the consolidated glass blank is modified by conducting two or more drawing steps. This process, known as the double re-drawing process, is disclosed in pending patent application Ser. No. 09/318,316 and is incorporated herein by reference in its entirety. The additional drawing step or steps eliminates the need for subsequent processing steps to remove inclusions within the glass core or preform, thereby reducing manufacturing time and cost. The consolidated glass blank is initially drawn at a first temperature, or a glass temperature ranging from about 1600 C to about 1900 C. A vacuum of about 100 torr or higher may be drawn along the centerline of the glass blank to circulate the Ar gas in the center aperture and drive off any residual water within the blank. The first draw step yields a glass preform, or cane, precursor which may contain a elongated seed or aperture along its centerline. The diameter of the consolidated glass blank is about 30 to 50 mm. After the initial drawing, the diameter of the resulting glass preform or cane precursor is about 20 to 35 mm.

The redrawing, or second drawing, step is performed at a second temperature, or a glass temperature ranging from about 1600 C to about 1800 C and produces a glass perform precursor or cane precursor. The second drawing step is preferably conducted under vacuum conditions applied along the centerline of glass preform or cane precursor. In a preferred embodiment of the present invention, the first drawing step is conducted at a higher temperature but a lower vacuum than the second drawing step. The higher vacuum in the second drawing step aids in removing the aperture along the centerline of the glass preform or cane precursor by closing one end of the aperture and evacuating the aperture. Thus, the resulting canes or preforms are substantially inclusion-free yet contain a higher concentration of alumina.

Figure 1B:
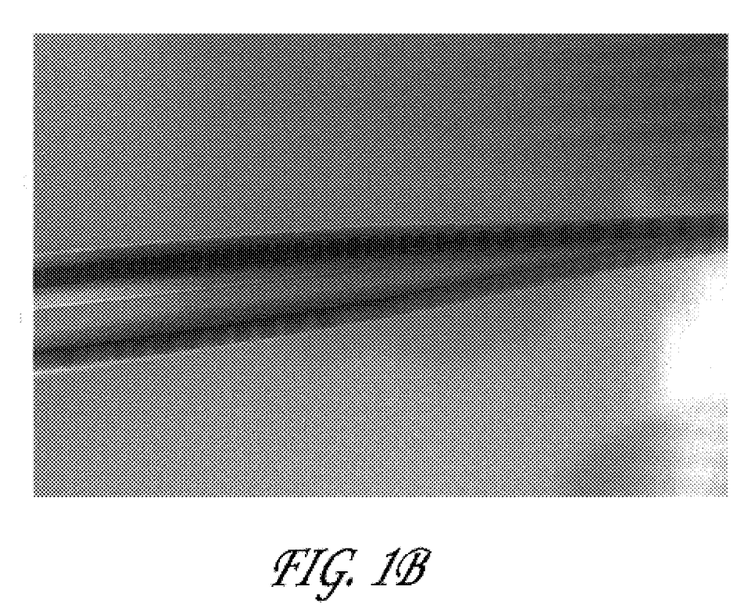
FIG. 1(b) is a photograph, taken at 10× magnification, of a Type III (see Table I) alumina-containing preform fabricated by the method of present invention.

Several important advantages are achieved by making optical waveguide preforms or waveguide core preforms (also referred to as canes or rods) using the methods of the invention. For example, one advantage of the present invention is providing a preform or cane that is substantially free of inclusions, such as air bubbles and crystallites. FIG. 1(b) is a photograph, at a magnification of approximately 10 times actual size, that illustrates the substantial absence of seeds present in a Type 3 (see supra Table I in Detailed Description) glass preform made from the present invention. A waveguide core preform free of such inclusions will require fewer processing steps to produce waveguide fiber, and waveguide fiber drawn therefrom will contain less scattering sites and thus have a lower attenuation. In addition, the methods are reproducible and enhance the utilization of the preform for subsequent fiber drawing. For example, a preform manufactured from one process of the invention can be used to draw 60 km to 360 km lengths of fiber from one preform. Preforms made from analogous methods of the art may yield far lower fiber lengths or, in worst case, be unusable for drawing fiber. Because greater lengths can be drawn from one preform, fiber costs are reduced. Fiber costs are also reduced due to the reduction of waste or scrap.

One embodiment of the present invention describes a method to produce $Er_2O_3$—$Al_2O_3$—$GeO_2$—$SiO_2$ fiber preforms with virtually no inclusions. The method disclosed is reproducible and can be scaled upward to meet production demands. The present invention can also be applied to other rare earth doped fiber compositions and preform fabrication processes.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention such as its application to other methods of fabricating fiber optic waveguide preforms and fibers, will be apparent from the following Detailed Description and the accompanying drawings.

Reference will now be made in detail to a present preferred embodiment of the invention, an example of which is illustrated in the accompanying drawing.

DETAILED DESCRIPTION

An optical fiber waveguide is drawn from a glass preform. A typical preform comprises a central core and an outer cladding layer. The materials of the core and cladding of the waveguide should be produced from a glass having minimum light attenuation characteristics. A typical glass preform is mainly fused silica ("$SiO_2$") with minor additions, i.e., about 0.001–25 weight % of dopants like germania ("$GeO_2$") or other additives. The core and cladding layers have different chemical compositions or are doped with various additives to allow the core to have a higher refractive index than the cladding layer and foster other optical properties.

Variations in the refractive index are obtained by adding dopants. Optical fiber preforms and waveguides are composed primarily of high purity silica glass. Certain dopants, such as the oxides of titanium, tantalum, thallium, lanthanum, germanium, aluminum and phosphorous are added, in a weight percentage ranging from about 0.001 to 25%, to increase the refractive index of the glass. Other dopants such as fluorine and boron oxide are added in similar amounts to decrease the refractive index of the glass and may be incorporated in a cladding layer. Rare earth metal dopants, such as erbium or other metals in the 57–71 series of the periodic table, are added to the fiber core composition to allow the resulting optical fiber to amplify an optical signal. Additional dopants to be incorporated into a glass preform composition may also include the alkaline earths or heavy metal fluorides. In a preferred embodiment, the preform core is doped with erbium, germanium, and aluminum oxides (i.e., $Er_2O_3$—$Al_2O_3$—$GeO_2$—$SiO_2$ fiber preforms). The present invention, however, is not limited to this composition. In a preferred embodiment, the soot preform is made by a chemical vapor deposition process. Fabrication of soot preforms through chemical vapor deposition processes is well-known in the art. Some examples of suitable processes are the outside vapor deposition process ("OVD" also known as the "OVPO" process), the modified chemical vapor deposition process ("MCVD"), the plasma-activated chemical vapor deposition process ("PCVD"), process ("VAD"). A more detailed discussion of these processes is provided in *Kirk-Othmer Concise Encyclopedia of Chemical Technology*, (Jacqueline I. Kroschwitz ed., 4th ed. 1999), pp. 824–827 or John M. *Senior, Optical Fiber Communications Principle and Practice* (1985), pp. 118–127 which are incorporated herein by reference. Another suitable OVD process is that disclosed in U.S. Pat. No. 4,453,961 which is incorporated herein by reference in its entirety. However, it is understood that the present invention is applicable to other CVD or glass preform fabrication processes.

Briefly, in the OVD process, at least one coating of particulate glass, or a porous layer of glass soot, is deposited to the outside peripheral surface of a rotating elongated mandrel in a machine called a lathe. The soot particulate layer is formed by oxidation of the glass constituents via flame hydrolysis. Liquid precursors containing silicon, such as $SiCl_4$ alone, or in combination with precursors containing dopants like germanium, such as $GeCl_4$, are heated within containers, such as bubblers or vaporizers, to form its gaseous phase. Other dopants, such as $AlCl_3$, which are in solid form, are sublimated or transformed into its gaseous phase by heating within sublimators. Carrier gases, such as oxygen, nitrogen or an inert gas, are combined with the $SiCl_4$ or other glass constituent gases and then fed through a port on the burner face. The soot is deposited via one or more burners which are translated across the growing soot particulate layer as it rotates on the mandrel. The burner includes additional ports for fuel and oxygen to support the burner and allow the reaction of the glass constituent gases with oxygen and/or water vapor to form oxides within a reaction zone.

The soot layers will comprise the core of the preform. Once the soot layers are deposited to a desired thickness, one of more cladding layers may be further applied. The cladding layer may be added directly to the soot core in a "soot-on-soot" deposition process or to a consolidated preform following consolidation of the soot core in a "soot-on-glass" process. In the "soot-on-soot" process, the vapor deposition process continues in the same fashion as before except the composition of the cladding layer is changed, or the glass constituents are adjusted, to allow the cladding layer to have a lower refractive index than the soot core layer. In the "soot-on-glass" process, the mandrel is removed leaving an essentially hollow, cylindrical soot blank core. The soot blank core is consolidated or sintered to provide a glass blank core having an aperture therethrough. The glass blank core is drawn, in at least one or more steps at a certain temperature to remove the aperture and reduce the diameter, to form a core rod (also known as a cane). After the drawing step is complete, the cladding layer is deposited via a later deposition step to form an overclad glass preform. The present invention is suitable for either method.

Figure 2:
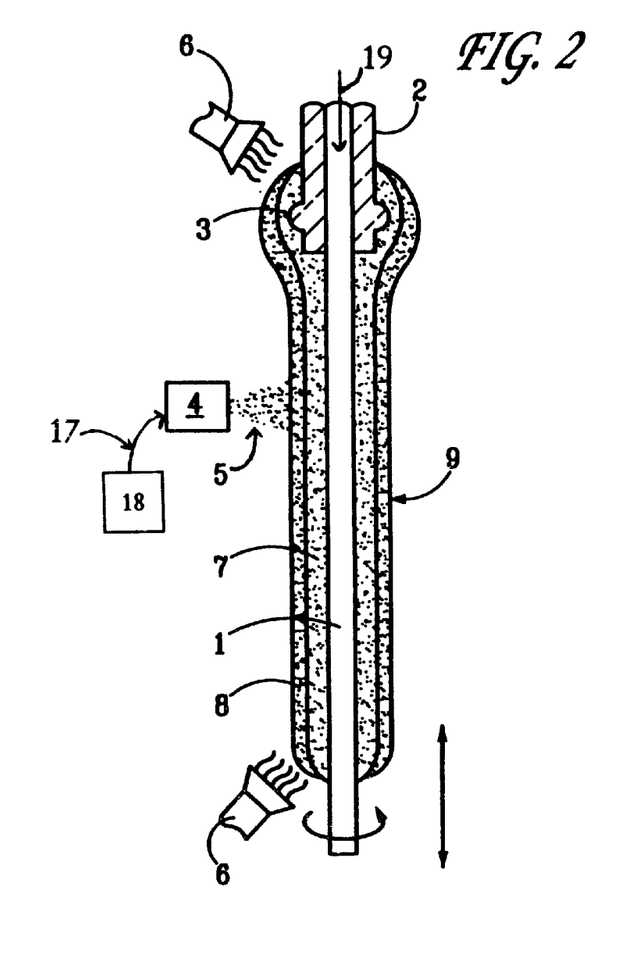
FIG. 2 illustrates the deposition of glass particles or soot onto the surface of a removable, rotating mandrel.

FIG. 2 provides an illustration of an overclad soot blank being formed via an OVD process. U.S. Pat. Nos. 4,453,961, 4,486,212, and 5236,481, the contents of which are all incorporated by reference herein, also disclose processes for an overclad preform or preform core fabrication. As FIG. 2 shows, the large diameter end of a tapered mandrel 1 is inserted into glass tube 2 having protrusions 3. Shims (not shown) can be used to secure tube 2 to mandrel 1 as disclosed in U.S. Pat. No. 4,289,517. Mandrel 1 is rotated and translated with respect to a burner 4 of the type disclosed in U.S. Pat. No. 4.165,223. One or more burners may be used in this process. In a preferred embodiment of the present invention, the burner 4 traverses across at a speed of about 2.5 cm/sec to about 3.5 cm/sec, more preferably 3.5 cm/sec. Fuel gas and oxygen or air are supplied to a burner to produce an open flame which is emitted from the burner and a precursor. The precursor may exist as a gas-vapor mixture, or as atomized droplets. Precursor can include an aluminum-containing material sublimated by sublimator 18 and can be carried to burner 4 via gas carrier flow 17. Reactant compounds, which comprise the glass constituents, emanate from the burner where they are then oxidized in the reaction zone to form a glass particulate, or soot, stream 5, which is directed toward the rotating mandrel 1. Auxiliary burners 6 may also be employed in the process to direct flames toward the end of the soot blank, as taught in U.S. Pat. No. 4,810,276.

Dopants may be used to increase the refractive index of the soot core layer 7 and comprise part of the soot stream, 5. Once the soot layer forming core layer 7 reaches its desired thickness, the glass constituents, oxidized in burner 4 to form the soot stream 5, are changed to form the soot cladding layer 8. Once the soot cladding layer 8 reaches its desired thickness, the soot blank 9 is formed. Additional dopants may be further added to the soot blank 9 during the consolidation step, as described in U.S. Pat. No. 5,236,481 and incorporated herein by reference. Gas flow 19 along the center line of the soot blank can also be present during consolidation.

According to one embodiment of the present invention, a soot blank is formed on a similar apparatus as depicted in FIG. 2 by depositing alumina, silica, germania, and rare earth dopant particles onto a rotating mandrel. The glass precursors containing alumina, silica, and germania can be, but are not limited to, aluminum, silicon, or germanium halides such as $AlCl_3$, $SiCl_4$, and $GeCl_4$. The silicon and germanium containing precursors are in liquid form and are heated in bubblers, vaporizers, or similar means to a temperature sufficient to produce a vapor. This vapor is transported through the burner to the reaction zone in front of the burner face by a carrier gas such as oxygen, argon, or other inert gases.

In one embodiment, the preform core contains a weight percentage of about 300 to 800 ppm, preferably 500 ppm, of the rare earth erbium. Erbium containing precursors, such as $Er(FOD)_3$ or $(Er(C_{30}H_{30}F_{21}O_6)_3)$, are heated in a bubbler to a temperature ranging from about 130° C. to about 200° C. to form a vapor. The vapor is then delivered to the reaction zone using a carrier gas. The erbium-containing vapor reacts and then is deposited onto the soot blank.

The aluminum-containing precursor is a solid and can be, but is not limited to, $AlCl_3$. The aluminum-containing solid is placed in a sublimator and heated to a temperature which ranges from about 130° C. to about 170° C., to form a vapor. Preferred embodiments of the present invention sublimate the aluminum-containing material at a higher temperature range, from about 150° C. to about 170° C., and use a gas such as argon or oxygen to carry the reactant to the burner for combustion. The flow rate of the carrier gas is decreased by more than half, from its typical flow rate of about 1.4 to 1.8 splm, to about 0.5 to 0.7 splm. In another preferred embodiment of the present invention, the erbium dopant is fed through a burner that is separated from the burner feeding the alumina, silica, and germania precursors.

The alumina content of the core preform can vary from about 0.5% to about 20% alumina by weight, or more preferably from about 2% to about 10% by weight, depending on the fiber amplifier requirements. The alumina may be increased in the glass core composition to achieve suitable waveguiding properties.

The amount of germania in the core preform will depend upon the desired refractive index profile of the core of the fiber made therefrom. A germania content of about 0% to about 25% by weight, preferably about 10% to about 20% by weight, and even more preferably from about 16% to about 18% by weight, can be used to make an erbium doped amplifier fiber.

Figure 4A:
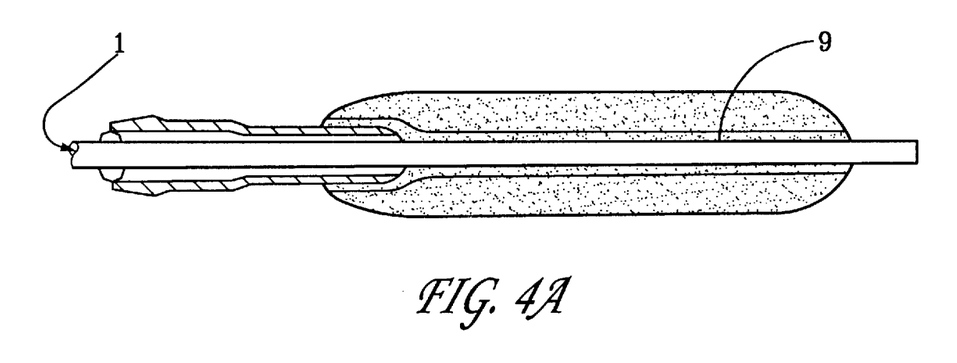
FIGS. 4(a) through (d) presents a cross-sectional view of a (a) soot blank; (b) glass blank; (c) cane precursor; (d) cane or preform.

After deposition of particulate soot material is completed to form a soot blank, the mandrel 1 may be removed from the assembly by pulling it out through the tubular handle, leaving a longitudinal aperture through the soot preform. The resulting soot blank 9, along with its removable mandrel 1, is depicted in FIG. 4(*a*). The steps of drying and consolidating the soot preform may be performed in accordance with the teachings of U.S. Pat. Nos. 4,125,388 and 5,236,481, the contents of which are both incorporated herein by reference. The drying and consolidating steps can be performed separately or simultaneously. Chlorine gas drying may occur at temperatures ranging from about 900 C to about 1400 C in order to reduce or eliminate any residual hydroxyl groups that may be present in the soot blank.

Figure 4B:
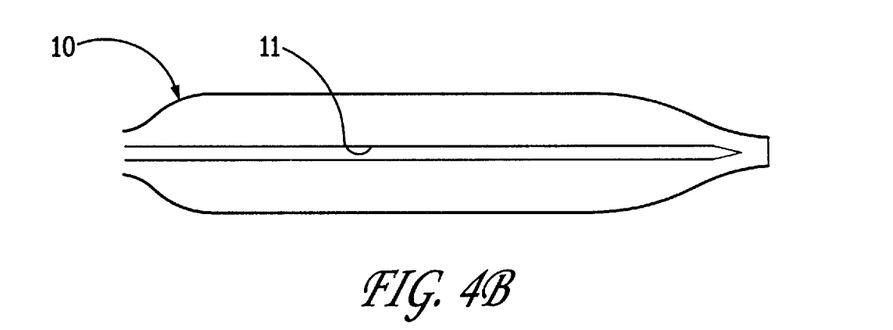

In the consolidating or sintering step, the hollow, cylindrical and porous soot core is collapsed to form a consolidated glass cane having a smaller diameter. The soot core is heated to a time and temperature sufficient to eliminate particulate boundaries. An example of a consolidated glass blank, 10, is illustrated in FIG. 4(*b*). This cross-sectional view of the consolidated glass blank also illustrates the longitudinal aperture or hollow, 11, along the glass blank's centerline caused by the removal of the mandrel. Traditional sintering steps occur at temperatures of about 1495 C while helium or another inert gas is flowed along the centerline of the soot blank at a rate of about 0.6 splm. One embodiment of the present invention, however, lowers the sintering temperature to a range of about 1400 C to about 1500 C or more, preferably from about 1400 C to about 1450 C, and increases the helium or gas flow to a range of about 1 to about 5 splm or more, preferably from about 1.5 to about 3.0 splm. The combination of higher gas flow rate and lower sintering temperature prevents the thermal decomposition of $GeO_2$ and reduces gas bubble formation in the resulting preform or cane.

Once the sintering step for the soot core is completed, the consolidated glass blank may be further subjected to an additional drying step.

Figure 3:
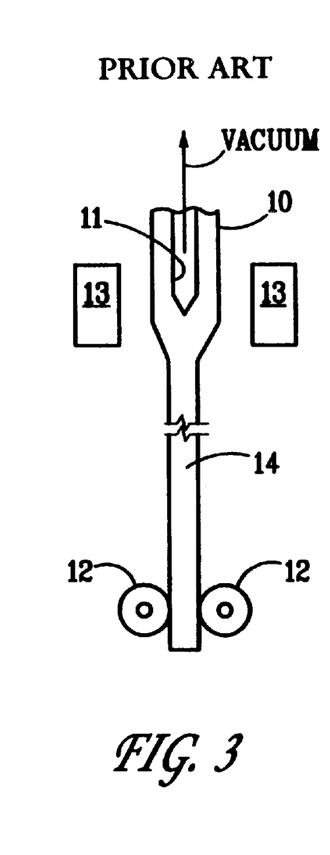
FIG. 3 illustrates a typical apparatus used in the manufacture of a optical fiber preform or preform core, known as a cane.

The consolidated glass blank is next inserted into the draw furnace. FIG. 3 shows a typical apparatus for drawing an optical waveguide core cane or preform from consolidated glass blank, 10. The furnace 13 heats the lower end of the blank 10 to its softening temperature. A cane or rod drawing mechanism, such as the motor driven tractors 12, draws a cane or rod 14 from the softened end of the blank or preform 10. The diameter of the cane or rod 14 is measured by a measuring device (not shown). As the lower end of the consolidated glass blank 10 is pulled downward, the diameter of the blank 10 decreases, the evacuated aperture 11 collapses and the cane or preform 14 is formed. As FIG. 3 shows, a vacuum pump is generally used during the cane drawing step to aid in closing the central aperture, 11, of the blank 10. The drawing rate may be controlled by an external measuring device to yield a glass cane or preform with a predetermined diameter. This measuring device is generally a non-contact, optical measurement to avoid damage to the pristine surface of the cane after it is drawn. The consolidated glass blank is then drawn into a cane or preform 4 that is about 3 m in length.

Preferred embodiments of the present invention draw the glass cane or preform in at least two drawing steps in an apparatus similar to the one depicted in FIG. 3. The first drawing step yields a glass preform precursor (if overclad) or glass cane precursor, 14, as shown in FIG. 4(c).

Figure 4C:
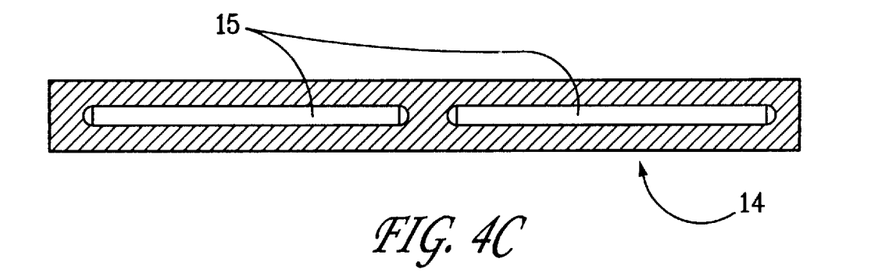

FIG. 4(c) provides a cross-sectional view of the preform or core precursor 14 which includes an elongated seed or aperture 15 within the center of the glass. The glass preform precursor or cane precursor, although it is transparent, is darkened to show the seed or aperture remaining in its center. Aperture 15 differs from aperture 11 which is caused by the removal of the mandrel. During the initial drawing step, seeds or gas bubbles, that result from the elevated temperatures of the drawing furnace, coalesce to form a lesser number of larger seeds than that contained in the original preform. These seeds typically coalesce along the center of the precursor to form an aperture with a smooth inner surface having a circular cross-section. If the reduced diameter preform or cane precursor contains more than one long continuous seed, the precursor may be cut into several sections. This precursor will then have an open aperture on the upper and lower ends and generally in the center of the preform. The open ends of the precursor aid in closing the apertures by facilitating the evacuation during the drawing step.

The first drawing step involves heating at least one end of the elongated, consolidated glass preform to a first temperature and drawing the preform to provide a reduced diameter preform. The consolidated glass blank is initially drawn at a first temperature, or a glass temperature ranging from about 1600 C to about 1900 C. Typically, the diameter of the preform is reduced from about 30 to 50 mm to a reduced diameter of about 20 to 35 mm. The blank can be fed into the furnace at a rate of about 5–20 mm/min, and the cane or cane drawing mechanism draws cane at a rate of about 15–50 mm/min. Preferably, an inert gas such as argon is flowed along the aperture of the preform to remove any impurities on the surface of the aperture that may be sites for inclusion formation. A flow rate of about 0.5 splm is generally sufficient. A vacuum pressure of about 100 torr or higher may be applied along the centerline of the glass blank to circulate the Ar gas in the center aperture and drive off residual water within the blank. Preferably, the step of evacuating the aperture is also performed during the second step, or re-drawing step, of the two-step draw process to aid in closing the center aperture. According to one embodiment of the present invention, during the first drawing step, air bubble inclusions coalesce to form continuous elongated air bubble inclusions along the centerline of the glass preform or cane precursor.

A fused silica tube is joined to the upper end of the preform and a handle having a flared end is joined to the preform or cane precursor. The second step of this embodiment involves drawing or re-drawing the reduced diameter preform into a cane at a temperature lower than the first step. Preferably, the temperature of the preform during this second step is about 1600° C. to 1800° C. Lower temperatures during the second drawing prevent seeds from reforming in the glass preform or cane precursor. A vacuum pump is connected to the handle attached to the preform or cane precursor, and a vacuum is drawn at about 0.03 to about 160 torr along the precursor's centerline to evacuate the aperture. The lower end of the glass preform or cane precursor is heated and has a downward force applied of about 5–20 mm/min for preforms and about 15–50 mm/min for canes. During the re-drawing step, the glass preform or cane precursor is reduced from its initial diameter of about 20 to 35 mm to about a 6 mm to 10 mm diameter cane. The method of the present invention yields a preform or cane that is substantially free of inclusions, including crystallites and air bubble inclusions.

Figure 4D:
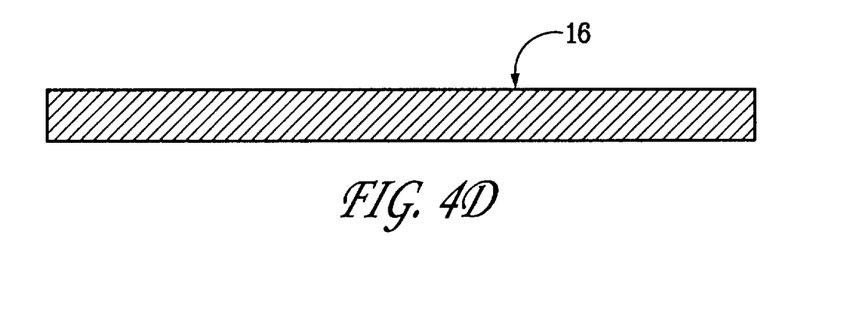

FIG. 4(d) illustrates a cross-section of the preform or cane, 16, that results from the second drawing or re-drawing step. Although the preform or cane is transparent, the cane is darkened in this illustration to show the absence of the aperture within the body of the glass.

According to one embodiment of this invention, the resulting preform or cane contains about 0.5% to 20% weight percent of $Al_2O_3$ and about 5% to 20% weight percent of $GeO_2$. In order to obtain a higher concentration of $Al_2O_3$, germania may even be reduced or eliminated from the composition. It is preferred that the furnace temperature for the first drawing step is set above the liquidus temperature for the silica and alumina mixture. The liquidus temperature varies depending upon the relative weight percentages of alumina and silica in the composition. Generally, alumina-containing glass blanks which contain higher weight percentages of germania should be processed at lower temperatures during the drawing step to prevent $GeO_2$ thermal decomposition. However, consolidated preforms containing large quantities of gas bubble inclusions may need to be processed at higher temperatures.

The temperature of the initial drawing step is preferably higher than the temperature of the subsequent drawing or re-drawing steps. In contrast, the vacuum applied during the initial drawing step is preferably lower (or vacuum is not applied) than the vacuum pressure of the re-drawing step. For example, according to one embodiment of this invention, an erbium doped core preform containing about 2% to 10% alumina by weight, about 10% to 20% germania by weight, and about 76% to 83% silica by weight, undergoes an initial drawing step at a glass temperature of about 1675 C to about 1900 C. A vacuum pressure of about 100 torr or higher may be applied to the centerline of the glass blank. Preferably, the second drawing or re-drawing step of the process is conducted at a glass temperature which ranges from about 1675 C to about 1800 C. A vacuum pressure of about 160 torr is applied along the centerline.

Thus, the present invention is directed to methods of making doped and undoped articles, that include, but are not limited to, single mode and multi-mode optical fiber waveguide and devices made therefrom, regardless of any specific description in the drawing or examples set forth herein. It will be understood that the present invention is not limited to use of any of the particular glass compositions or temperature ranges discussed herein. Indeed the invention is useful for eliminating inclusions in various other glass compositions, particularly those compositions that are susceptible to inclusion formation. For example, optical waveguide preforms prepared from heavy metal fluoride glasses are particularly susceptible to crystallite formation.

EXPERIMENT 1

Three different glass preforms, which contain differing amounts of erbium, alumina, and germania dopants in the preform core, were prepared in accordance with the present invention and their compositions are reflected in Table I.

TABLE I

| Fiber: | $Al_2O_3$ (Wt. %): | $Er_2O_3$ (ppm): | $GeO_2$ (Wt. %): | $SiO_2$ (Wt. %): |
|---|---|---|---|---|
| Type 1 | 0.7–1.2 Typically 1.0 | 300–800 Typically 500 | 20 | Balance |

TABLE I-continued

| Fiber: | Al$_2$O$_3$ (Wt. %): | Er$_2$O$_3$ (ppm): | GeO$_2$ (Wt. %): | SiO$_2$ (Wt. %): |
|---|---|---|---|---|
| Type 2 | 1.8–4.5 Typically 2.5 | 300–800 Typically 500 | 18 | Balance |
| Type 3 | 4.5 or greater Typically 8–10 | 300–800 Typically 500 | 12–14 | Balance |

The preforms were fabricated using an OVD chemical vapor deposition process and then drawn into a length of optical fiber. As Table I illustrates, the amount of erbium dopant was kept relatively constant in each glass composition, around 500 ppm, whereas the weight percentage of alumina and germania dopants was varied. For example, The Type 1 fiber composition had the highest weight percentage of GeO$_2$ and the lowest weight percentage of Al$_2$O$_3$. By contrast, the Type 3 fiber contained the lowest concentration of germania dopant in its composition but had the highest weight percentage of Al$_2$O$_3$. The method of the present invention allows one to make a higher alumina glass fiber while minimizing inclusions that accompany higher alumina concentration.

The enhanced optical properties of higher aluminum containing fibers are well known in the art. Fibers, such as the Type 3 fiber, will exhibit more desirable optical properties in comparison to fibers with lesser amounts of aluminum, such as the Type 1 fiber. For example, the Type 3 fiber exhibits a lower ripple value than a Type 1 fiber. Ripple value reflects the difference between the minimum gain peak and the maximum gain peak at divided by the minimum gain peak within a wavelength range of between about 1525 nm and about 1575 nm. The Type 3 fiber also flattens the Erbium profile when an optical signal is propagated over its length. In addition, the Type 3 fiber has a broadened operating wavelength span, or expanded bandwidth, in comparison to the Type 1 fiber.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A method for manufacturing an alumina-containing glass article that is substantially free of inclusions, said method comprising the steps of:
   a. forming soot through oxidation of glass constituent vapors and oxygen gas by exposure to a heat source within a reaction zone, wherein one of said glass constituent vapors is produced by sublimation of an aluminum-containing material at a sublimation temperature range of about 130° C. to about 170° C. and transported by a carrier gas to said reaction zone;
   b. consolidating said soot at a sintering temperature sufficient to sinter said soot into a glass blank;
   c. drawing the glass blank by heating at least one end of said glass blank to a first temperature to produce a precursor of a certain diameter; and
   d. re-drawing the precursor by heating at least one end of said precursor to a second temperature to produce an alumina-containing glass article of a certain diameter, said article having a diameter less than that of said precursor,
      wherein the heat source, in said forming step, is a burner that traverses across said soot at a rate of about 2.5 to about 3.5 cm/sec.

2. The method as disclosed in claim 1 wherein the heat source, in said forming step, is a burner that traverses across said soot at a rate of about 3.0 cm/sec.

3. The method as described in claim 1 wherein said re-drawing step, is conducted under a vacuum of between about 0.03 to about 160 torr.

4. The method as described in claim 1 wherein said glass article is comprised of between about 0.5% by weight and about 20% by weight of alumina.

5. The method as described in claim 4 wherein said glass article is comprised of between about 2% by weight and about 10% by weight of alumina.

6. A method of producing an alumina-containing optical fiber waveguide perform that is substantially free of inclusions, said method comprising the steps of:
   a. heating glass constituents to a temperature sufficient to transform said constituents into a vapor, such that at least one of said glass constituents
   contains aluminum which is sublimated at a temperature range of about 130° C. to about 170° C.;
   b. transporting said vapor via a carrier gas to a reaction zone;
   c. reacting said vapor by exposing said vapor to a heat source to form a soot blank;
   d. consolidating said soot blank at a temperature sufficient to form a glass blank substantially free from particle boundaries;
   e. drawing said glass blank by heating at least one end of said blank to a first temperature to produce a precursor of a certain diameter; and
   f. re-drawing the precursor by heating at least one end of said precursor to a second temperature to produce a perform having a certain diameter, said perform having a diameter less than that of said precursor,
      wherein said heat source, in said reacting step, traverses said soot blank at a rate between about 2.5 cm/sec to about 3.5 cm/sec.

7. The method as described in claim 6 wherein said heat source, in said reacting step, traverses said soot blank at a rate of about 3.0 cm/sec.

8. The method as described in claim 6 wherein said redrawing step is conducted under a vacuum of about 160 torr or less.

9. The method as described in claim 6 wherein said optical fiber waveguide perform is comprised of between about 0.5% by weight and about 20% by weight of alumina.

10. The method as described in claim 9 wherein said optical fiber waveguide perform is comprised of between about 2% by weight and about 10% by weight of alumina.

* * * * *

UNITED STATES PATENT AND TRADEMARK OFFICE
CERTIFICATE OF CORRECTION

PATENT NO.    : 6,474,106 B1
DATED         : November 5, 2002
INVENTOR(S)   : Qi Gang et al.

It is certified that error appears in the above-identified patent and that said Letters Patent is hereby corrected as shown below:

Column 12,
Line 22, "fiber waveguide perform that is substantially free of" should be -- fiber waveguide preform that is substantially free of --
Line 41, "perform having a certain diameter, said perform having" should be -- preform having a certain diameter, said preform having --
Line 53, "fiber waveguide perform is comprised of between about" should read -- fiber waveguide preform is comprised of between about --
Line 56, "optical fiber waveguide perform is comprised of between" should be -- optical fiber waveguide preform is comprised of between --

Signed and Sealed this

Fifth Day of August, 2003

JAMES E. ROGAN
*Director of the United States Patent and Trademark Office*